United States Patent [19]
Nakajima

[11] Patent Number: 5,544,542
[45] Date of Patent: Aug. 13, 1996

[54] SHOCK ABSORBING STEERING DEVICE AND METHOD OF MANUFACTURING THE DEVICE

[75] Inventor: Terukazu Nakajima, Nara, Japan

[73] Assignee: Koyo Seiko Co., Ltd., Osaka, Japan

[21] Appl. No.: 255,715

[22] Filed: Jun. 7, 1994

[30] Foreign Application Priority Data

Jun. 8, 1993 [JP] Japan .................................. 5-036373

[51] Int. Cl.⁶ ...................................................... B62D 1/18
[52] U.S. Cl. ............................................. 74/492; 188/371
[58] Field of Search .............................. 74/492; 280/777; 188/371, 376

[56] References Cited

U.S. PATENT DOCUMENTS

| | | |
|---|---|---|
| 3,392,599 | 7/1968 | White . |
| 3,696,891 | 10/1972 | Poe .............................................. 74/492 |
| 4,006,647 | 2/1977 | Oowuma et al. ........................... 74/492 |
| 4,098,141 | 7/1978 | Yamaguchi . |

FOREIGN PATENT DOCUMENTS

| | | |
|---|---|---|
| 109749 | 5/1984 | European Pat. Off. . |
| 1630005 | 8/1973 | Germany . |
| 2918179 | 11/1980 | Germany . |
| 57-201761 | 12/1982 | Japan . |
| 1164146 | 9/1969 | United Kingdom . |

*Primary Examiner*—Rodney H. Bonck
*Assistant Examiner*—David Fenstermacher
*Attorney, Agent, or Firm*—Popham, Haik, Schnobrich & Kaufman, Ltd.

[57] ABSTRACT

Rotation of a steering wheel (7) is transferred to a steering gear (17) via a pipe-like first shaft (2) and a second shaft (3), which is inserted in the first shaft (2) so that transfer of rotation between the two shafts (2), (3) and relative axial movement between the two shafts (2), (3) are allowable. A ball (23) inserted in a through hole (20) formed through the first shaft (2) is held by a recess (21) formed on the outer surface of the second shaft (3), so that a portion of the ball (23) is projected from the outer surface of the second shaft (3). The inner surface of the first shaft (2) is plastically deformed by the ball (23) by displacing the recess (21) away from the through hole (20) to form a groove (25).

7 Claims, 11 Drawing Sheets

SHOCK ABSORBING STEERING DEVICE AND METHOD OF MANUFACTURING THE DEVICE

FIELD OF THE INVENTION

The present invention relates to a shock absorbing steering device for absorbing a shock acting on a driver via a steering wheel in case of a car smash.

DESCRIPTION OF THE RELATED ARTS

FIG. 11 shows a conventional shock absorbing steering device (U.S. Pat. No. 4,098,141) which comprises a column 101 fitted on a vehicle body via a bracket 112, a pipe-like first shaft 102 inserted into the steering column 101, and a second shaft 103 which is inserted in the first shaft 102 so that transfer of rotation between the two shafts 102, 103 and relative axial movement between the two shafts 102, 103 are allowable. The first shaft 102 is connected to a steering wheel 113 via an input shaft 105 which is supported by the column 101 via a bearing 104. The second shaft 103 is connected to vehicle wheels via a steering gear (omitted from the figure). Two circumferential grooves 108 are formed on the outer surface of the second shaft 103. Each circumferential groove 108 faces two filler holes 109 formed through the first shaft 102. Each circumferential groove 108 and each filler hole 109 are filled by synthetic resin 110 to form a shear portion. At the position away from the first shaft 102 to the steering gear side (i.e., to down side in FIG. 11), a recess 103a is formed on the outer surface of the second shaft 103. A steel ball 111, which is harder than the first shaft 102, is press fitted into the recess 103a so that a portion of the ball 111 is projected from the outer surface of the second shaft 103. 10 When a shock acts on the above steering device, shearing of the shear portions made of the synthetic resin 110 absorbs energy of the shock in the first place. The first shaft 102 axially moves relative to the second shaft 103 in the next place, so that the ball 111 deforms the inner surface of the first shaft 102 plasticly to form a groove. The plastic deformation of the first shaft 102 absorbs energy of the shock.

In the above conventional constitution, since the ball 111 is press fitted into the recess 103a of the second shaft 103, it is difficult to control the amount of the projection of the ball 111 from the outer surface of the second shaft 103. In the other words, it is difficult to control the level of the plastic deformation of the first shaft 102 by the ball 111. Thereby, there are possibilities such that the driver suffers excessive shock or energy of shock is not absorbed sufficiently when the ball 111 deforms the first shaft 102 plasticly. Besides, if the force for the press fit of the ball 111 into the recess 103a is insufficient, the ball 111 may come off the recess 103a.

Occasionally, a switch 122 of a horn 121 is mounted on the steering wheel 113, wherein one terminal 122a of the switch 122 is connected to the vehicle body 124 via the horn 121 and a battery 123, and the other terminal 122b is connected to the vehicle body 124 via the input shaft 105. In this case, the input shaft 105 is electrically connected to the column 101 via conductive grease enclosed in the bearing 104 or a brush disposed between the input shaft 105 and the column 101 or the like, and the column 101 is electrically connected to the vehicle body 124 via the bracket 112, so that the input shaft 105 is electrically connected to the vehicle body 124. Thereby the input shaft 105 and the column 101 constitute a part of circuit for driving the horn 121. However, when the input shaft 105 and the steering column 101 constitute a part of the horn driving circuit, the conductive grease enclosed into the bearing 104 or a brush disposed between the input shaft 105 and the column 101 or the like is required, so that constitution of the horn driving circuit is complicated.

A shock absorbing steering device disclosed in Unexamined Japanese Patent Publication SHO No. 57-201761 comprises a first shaft constituting a steering shaft, a second shaft which is inserted in the first shaft so that transfer of rotation between the two shafts and relative axial movement between the two shafts are allowable, a ball disposed between the inner surface of the first shaft and the outer surface of the second shaft, and shear portions made of synthetic resin for restricting the relative axial movement between the two shafts. The ball is held by a recess formed on the outer surface of the second shaft so that a portion of the ball is projected from the outer surface of the second shaft. When a shock acts on the steering device, shearing of the shear portions absorbs the shock in the first place, and then the plastic deformation of the inner surface of the first shaft by the ball absorbs the shock.

In the steering device disclosed by the Japanese Patent Publication, the level of the plastic deformation of the inner surface of the first shaft is controlled by controlling the inner diameter of the first shaft. To be more precise, the inner diameter of the first shaft varies stepwise so that the level of the plastic deformation of the first shaft by the ball varies stepwise. However, since the inner surface of the first shaft should be machined with high accuracy to control the inner diameter, manufacturing process and manufacturing costs are increased.

It is an object of the present invention to provide a shock absorbing steering device which is free from above problems and a method of manufacturing the steering device.

SUMMARY OF THE INVENTION

The present invention is applied to a shock absorbing steering device having a first shaft and a second shaft, which is inserted in the first shaft so that rotation between the two shafts and relative axial movement between the two shafts are allowable, to transfer rotation of a steering wheel to a steering gear. The steering device according to the present invention comprises a through hole formed through the first shaft, a groove formed on the inner surface of the first shaft so that the groove connects with the through hole, a recess formed on the outer surface of the second shaft, and a ball held by the recess so that a portion of the ball is projected from the outer surface of the second shaft, wherein the ball is sized so as to be able to pass the through hole, and the projected portion of the ball from the outer surface of the second shaft is inserted in the groove.

When a shock acts on the steering device according to the present invention, the first shaft axially moves relative to the second shaft, and then the ball deforms the inner surface of the first shaft plasticly so that a groove which is a continuation to the above groove is formed. Energy of the shock is absorbed by the plastic deformation of the first shaft to form the continuation groove. Since the ball is sandwiched between the outer surface of the second shaft and the inner surface of the first shaft, the ball is prevented from coming off the recess without press fitting the ball into the recess. Since there is no need to press fit the ball into the recess, it is easy to control the amount of the projection of the ball from the outer surface of the second shaft to a settled dimension.

It is preferable that a shear portion is provided to restrict the relative axial displacement between the two shafts, and the ball is positioned between both ends of the groove so that relative axial movement between the two shafts occurs after shearing of the shear portion. By this constitution, when a shock acts on the steering device, shearing of the shear portion absorbs the shock in the first place, and then said plastic deformation of the inner surface of the first shaft to form the continuation groove absorbs the shock. Thus, the driver is prevented from suffering excessive shock. When the shear portion is made of synthetic resin, some synthetic resin infiltrating into between the two shafts prevents stable electrical conduction between the two shafts. Even so, when the first shaft, the second shaft and the ball are electrically conductive and constitute a part of a horn driving circuit, stable electrical conduction can be achieved.

A method of manufacturing the shock absorbing steering device according to the present invention comprises the steps of inserting the ball in the through hole formed through the first shaft, holding the ball by the recess formed on the outer surface of the second shaft so that a portion of the ball is projected from the outer surface of the second shaft, and displacing the recess away from the through hole to deform the inner surface of the first shaft plasticly by the ball so that the groove is formed. Thereby, the groove on the inner surface of the first shaft is formed only by the relative axial movement between the first shaft and second shafts, so that the manufacturing process and manufacturing costs are greatly reduced.

It is preferable that the load required to form the groove by the plastic deformation of the inner surface of the first shaft with the ball is measured. Since the measured value corresponds to the load required to form said continuation groove, the level of energy of shock absorbed by the steering device of the present invention can be previously known before the shock acts actually. Therefore, by utilizing the measured value for the design of the shock absorbing steering device, it can be prevented previously that the driver suffers excessive shock or energy of shock is not absorbed sufficiently. Further, by comparing the measured value to a value required to absorb the energy of shock properly, inferior manufactured devices which can not absorb energy of the shock properly can be found. Thus, shock absorbing steering devices which absorb energy of shock properly and stably can be manufactured.

DESCRIPTION OF THE PREFERRED EMBODIMENTS

Figure 6:
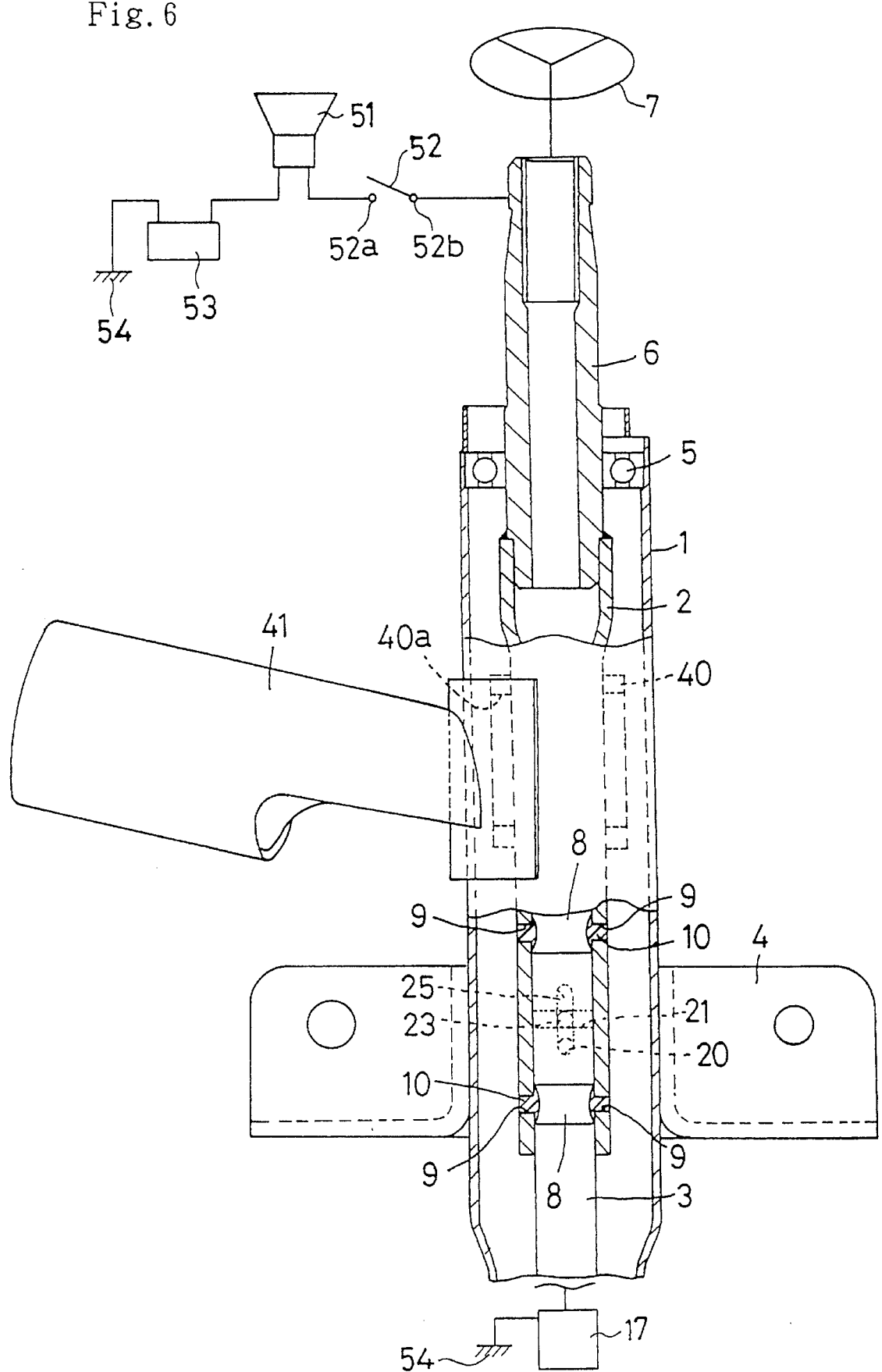
FIG. 6 is a cross-sectional view of the shock absorbing steering device of the embodiment.

A shock absorbing steering device shown in FIG. 6 comprises a column 1 fitted to a vehicle body 54 via a bracket 4, a pipe-like first shaft 2 inserted into the column 1, and a second shaft 3 which is inserted in the first shaft 2 so that transfer of rotation between the two shafts 2, 3 and relative axial movement between the two shafts 2, 3 are allowable. The first shaft 2 is welded to an input shaft 6 which is supported by the column 1 via a bearing 5. The input shaft 6 is connected to a steering wheel 7. The second shaft 3 is connected to vehicle wheels (omitted from the figure) via a steering gear 17. A lock ring 40 having a lock groove 40a is welded on the outer surface of the first shaft 2. A cylindrical holder 41 welded to the column 1 holds a lock mechanism (omitted from the figure). A key projected from the lock mechanism is inserted in the lock groove 40a when the vehicle's starting switch is off, so that the steering wheel 7 is locked to be inoperative. The lock mechanism can be any of prior art types.

A switch 52 for honking a horn 51 is mounted on the steering wheel 7, wherein one terminal 52a of the switch 52 is connected to the vehicle body 54 via the horn 51 and a battery 53, and the other terminal 52b is connected to the vehicle body 54 via electrically conductive components constituted of the input shaft 6, the first shaft 2, a ball 23, the second shaft 3, and the steering gear 17. Thus, the first shaft 2, the ball 23, and the second shaft 3 constitute a part of a driving circuit of the horn 51. Thereby, there is no need to enclose conductive grease into the bearing 5 or dispose a brush between the input shaft 6 and the column 1, so that the constitution of the horn driving circuit is simplified and stable electrical conduction can be achieved.

Figure 2:
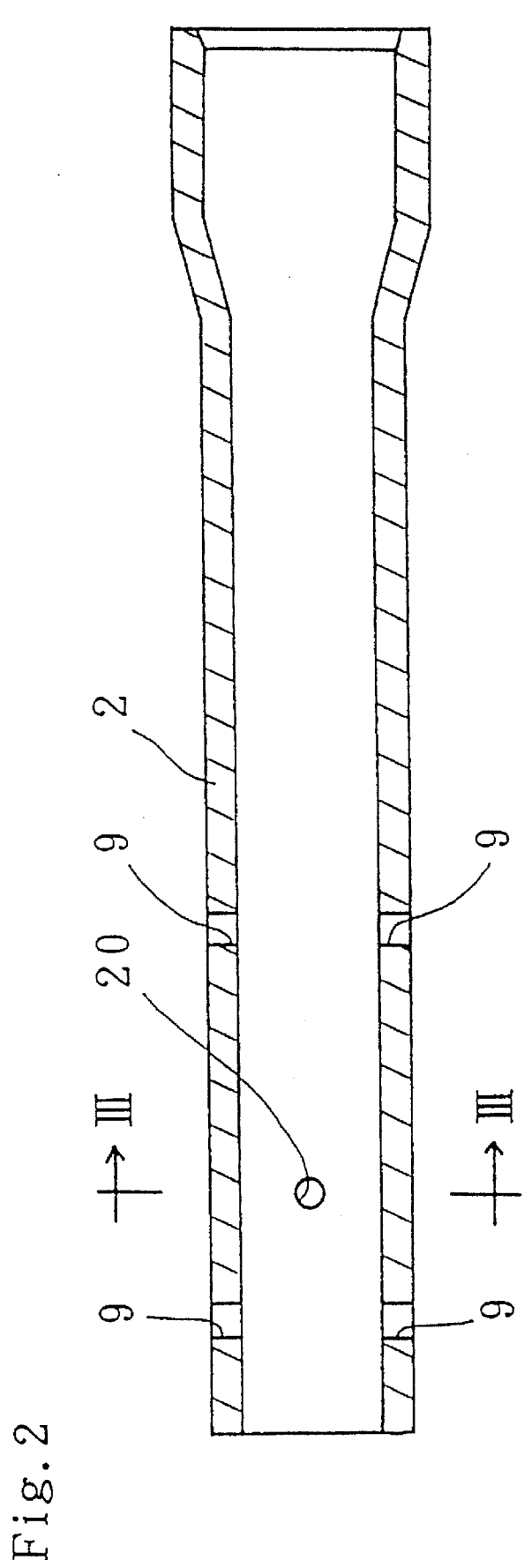
FIG. 2 is a cross-sectional view of a first shaft of the embodiment.
Figure 3:
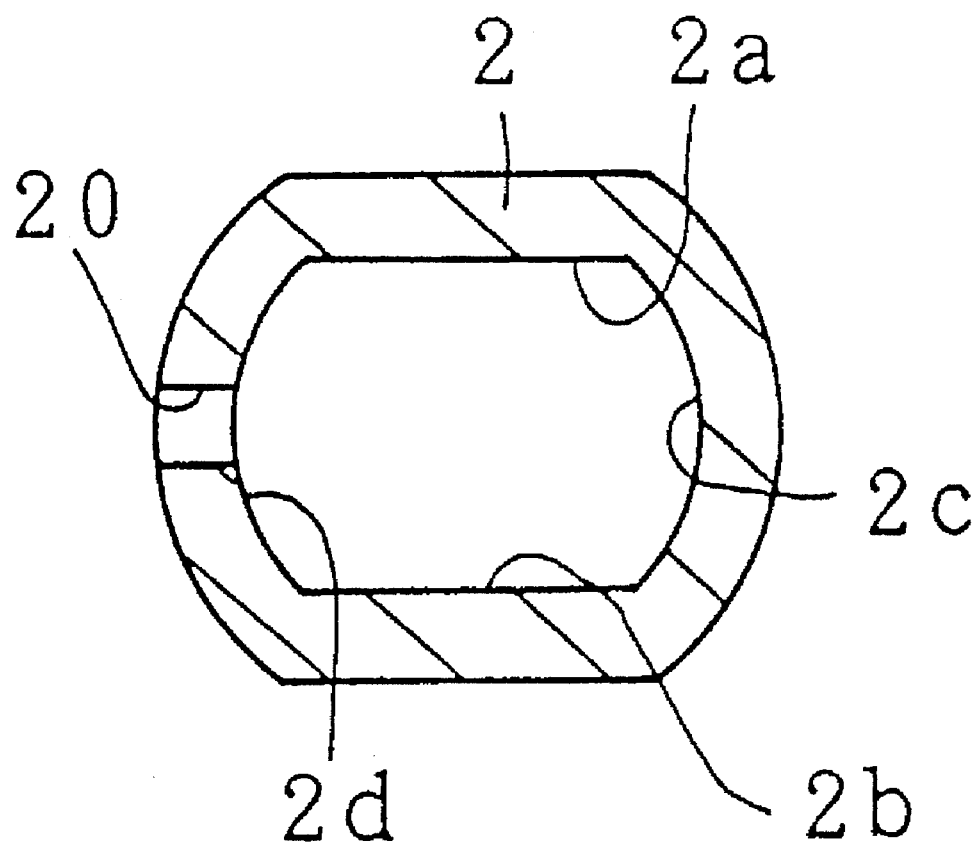
FIG. 3 is a cross-sectional view taken along the direction line III—III in FIG. 2.
Figure 4:
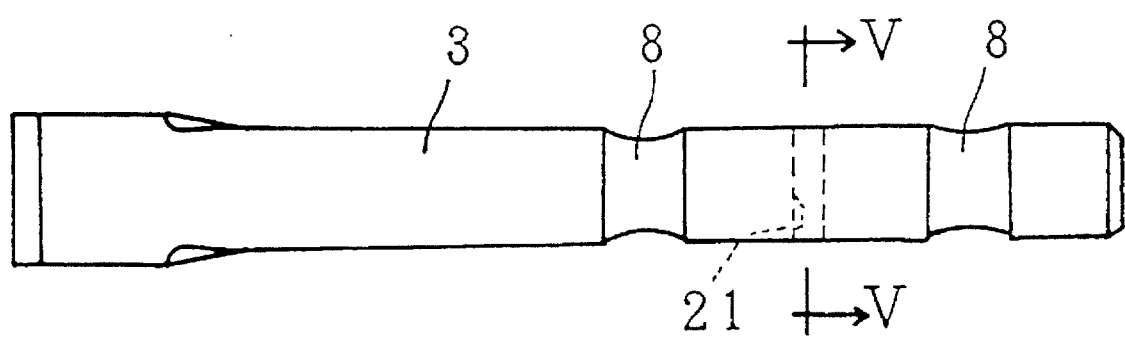
FIG. 4 is a side view of a second shaft of the embodiment.
Figure 5:
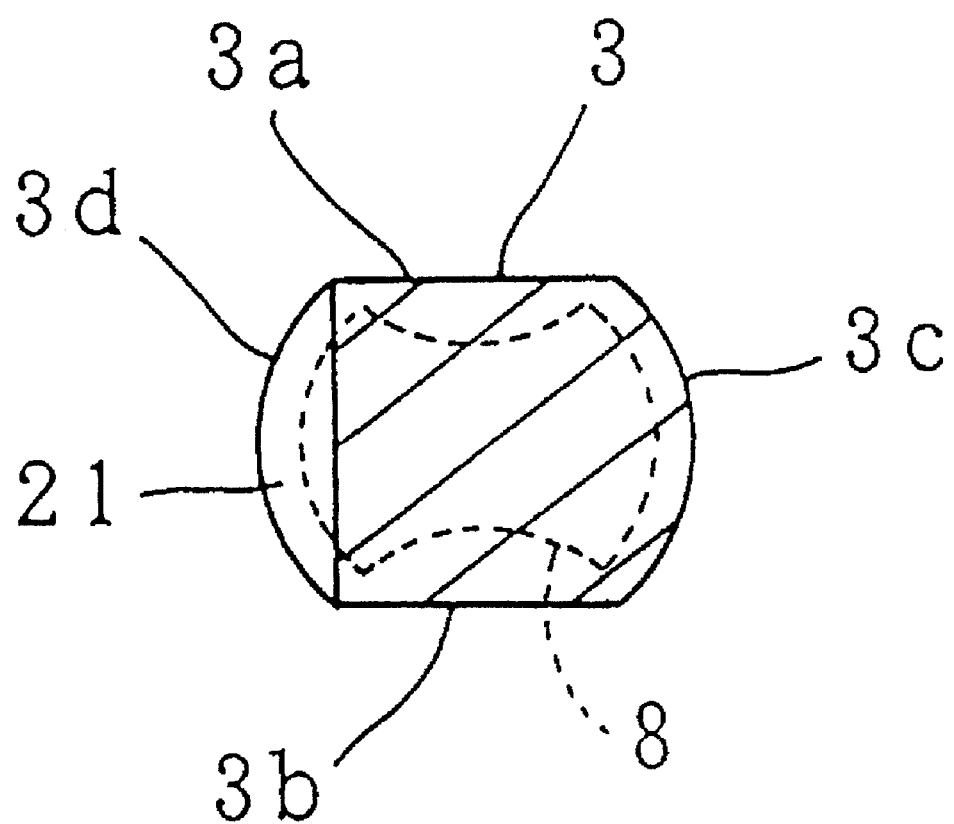
FIG. 5 is a cross-sectional view taken along the direction line V—V in FIG. 4.

As shown by FIG. 2 and FIG. 3, the inner surface of the first shaft 2 has two flat surfaces 2a, 2b opposed to each other and two arc-shaped surfaces 2c, 2d opposed to each other. As shown by FIG. 4 and FIG. 5, the outer surface of the second shaft 3 has two flat surfaces 3a, 3b opposed to each other and two arc-shaped surfaces 3c, 3d opposed to each other. This constitution prevents the relative rotation between the two shafts 2, 3 when the second shaft 3 is inserted in the first shaft 2, so that rotation of one of the two shafts 2, 3 is transferable to the other and relative axial movement between the two shaft 2, 3 is allowable. Thus, the rotation of the steering wheel 7 is transferred to the steering gear 17 via the two shafts 2, 3, so that the vehicle wheels are steered by the steering gear 17.

Two circumferential grooves 8 are formed on the outer surface of the second shaft 3 at intervals along the axial direction. Each groove 8 respectively faces two filler holes 9 formed through the first shaft 2. Plural shear portions made of synthetic resin 10 filled into each circumferential groove 8 and each filler hole 9 restrict the relative axial movement between the first shaft 2 and the second shaft 3.

Figure 7A:
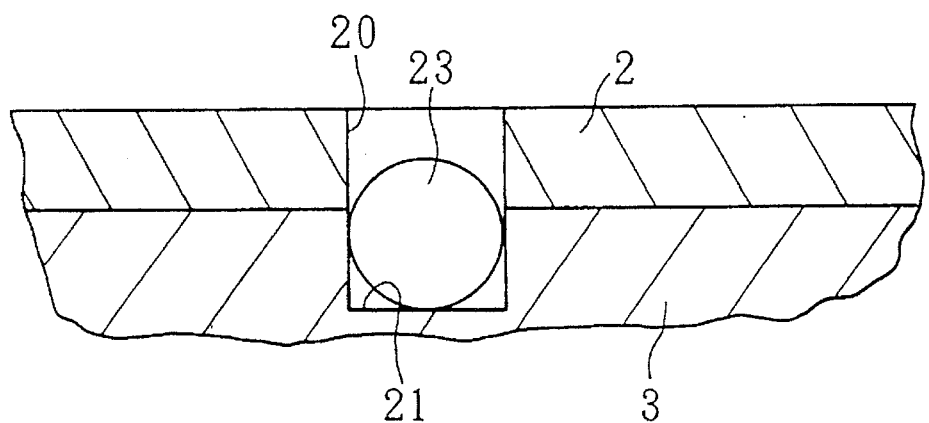
FIG. 7A, FIG. 7B and FIG. 7C are enlarged cross-sectional views showing the manufacturing process of the major components of the shock absorbing steering device of the embodiment.
Figure 7B:
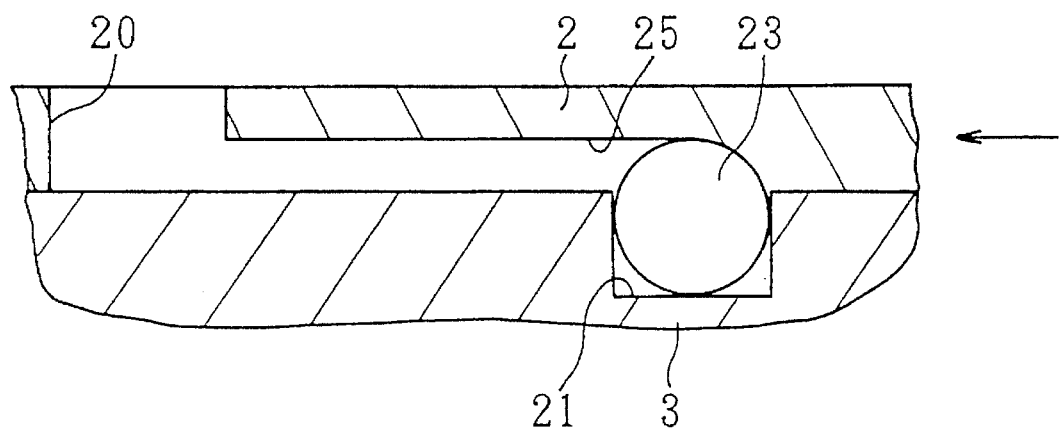
Figure 7C:
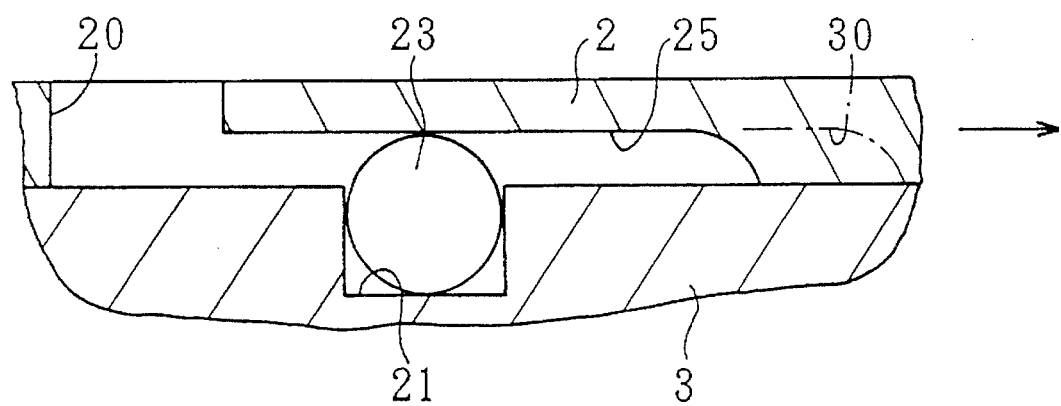

A through hole 20 positioned between the filler holes 9 facing the one of the grooves 8 and filler holes 9 facing the other of the grooves 8 is formed through the first shaft 2. A groove-like recess 21 positioned between the two circumferential grooves 8 is machined parallel to the diametral direction on the outer surface of the second shaft 3. The recess 21 holds the steel ball 23 which is harder than the first shaft 2. The diameter of the through hole 20 and the width of the recess 21 are set slightly larger than the diameter of the ball 23. As shown in FIG. 7A, FIG. 7B and FIG. 7C, the depth of the recess 21 is set smaller than the diameter of the ball 23, and thus, the ball 23 can be held by the recess 21 in a manner that a portion of the ball 23 is projected from the outer surface of the second shaft 3. A groove 25 which connects with the through hole 20 and faces the recess 21 is formed along the axial direction of the first shaft 2. The projected portion of the ball 23 from the outer surface of the second shaft 3 is inserted in the groove 25. The groove 25 is formed as the result of plastic deformation of the inner surface of the first shaft 2 by the ball 23.

Figure 1A:
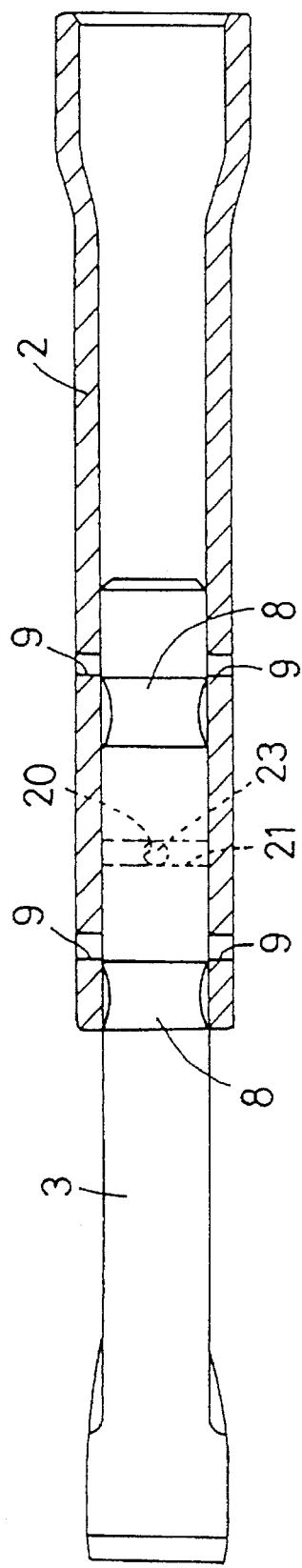
FIG. 1A, FIG. 1B, and FIG. 1C show manufacturing process of major components of a shock absorbing steering device of an embodiment according to the present invention.
Figure 1B:
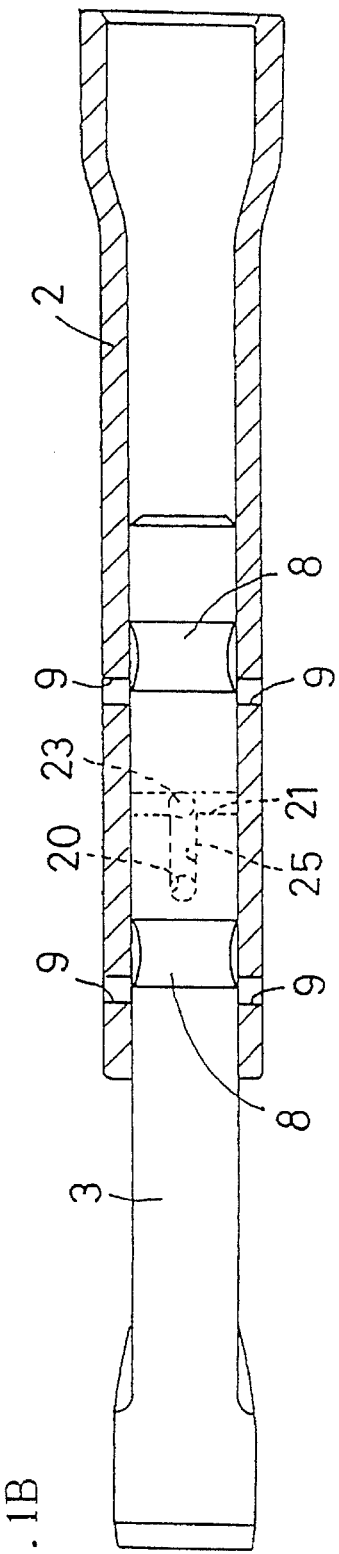
Figure 1C:
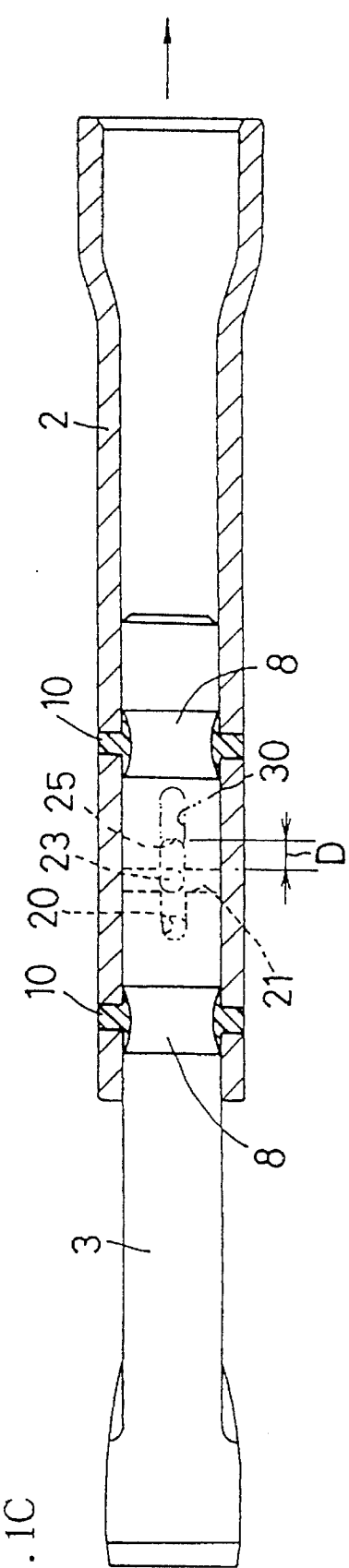

To connect the first shaft 2 with the second shaft 3, as shown by FIG. 1A and FIG. 7A, the second shaft 3 is inserted in the first shaft 2 so that the through hole 20 and the recess 21 meet to each other in the first place. Next, the ball 23 is inserted in the through hole 20 so that the ball 23 is held by the recess 21. Next, as shown by an arrow in FIG. 1B and FIG. 7B, the recess 21 is displaced away from the through hole 20 by moving the first shaft 2 relatively to the second shaft 3, wherein the direction of the relative movement of the two shafts 2, 3 is the same direction in which the two shafts 2, 3 moves relatively by a shock (i.e., the direction of movement of the first shaft 2 relative to second shafts is left in FIG. 1B and FIG. 7B). Thus, the inner surface of the first shaft 2 is plasticly deformed by the ball 23, so that the groove 25 is formed. The ball 23 and the second shaft 3 are harder than the first shaft 2 so that only the first shaft 2 is plasticly deformed. Next, as shown by an arrow in FIG. 1C and FIG. 7C, the first shaft 2 is moved relatively to the second shaft 3 in the direction opposite to the direction in which the two shaft 2, 3 move relatively by a shock. Thus, the ball 23 is positioned between both ends of the groove 25, wherein there is a distance of D between the ball 23 and the one end of the groove 25 (i.e., right hand end of the groove 25 in FIG. 1C). Then, each groove 8 and each filler hole 9 are filled with the synthetic resin 10 to restrict the relative axial movement between the two shafts 2, 3 by the shear portions.

Figure 8:
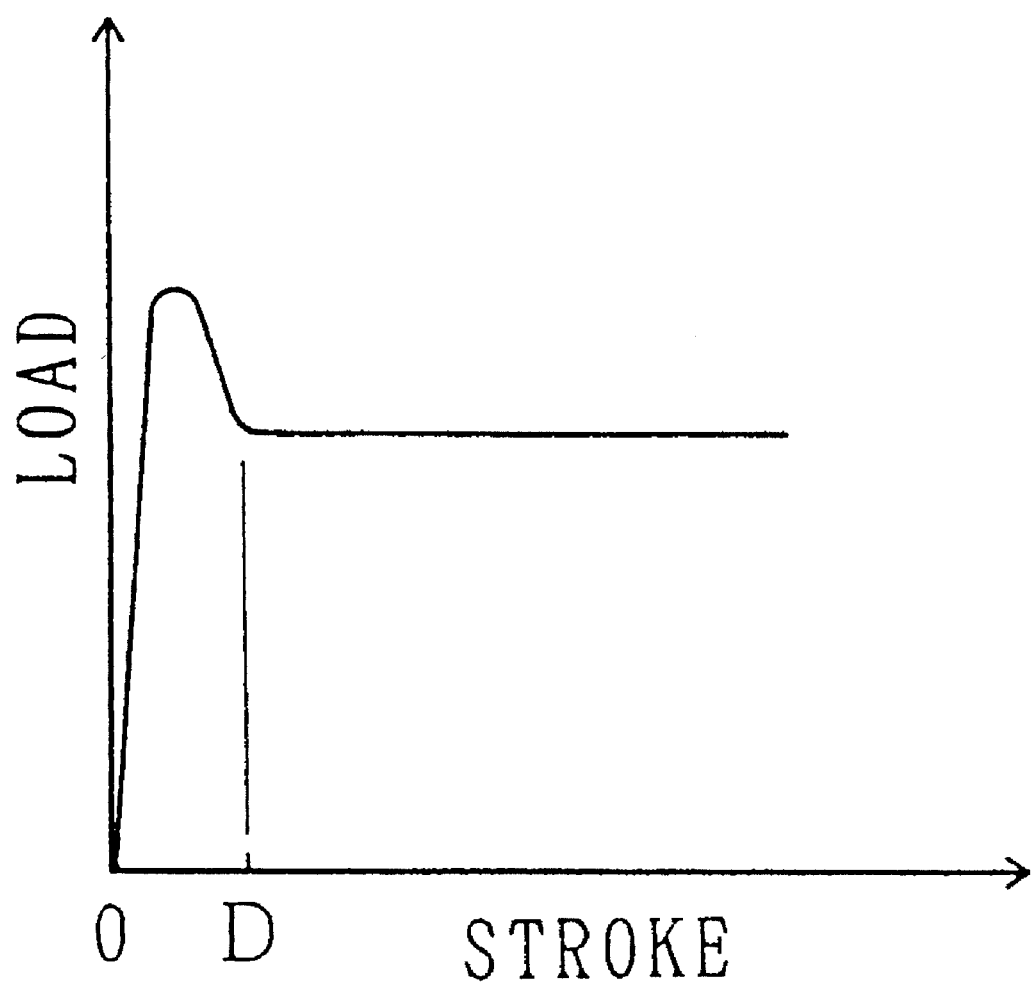
FIG. 8 shows a relationship of shock load to the relative axial stroke between the first shaft and the second shaft.

When a shock acts on the above-mentioned steering device, energy of the shock is absorbed by shearing of the shear portions made of the synthetic resin 10 in the first place. Subsequently, the first shaft 2 axially moves relative to the second shaft 3, so that the ball 23 reaches the one end of the groove 25. The first shaft 2 axially moves further relative to the second shaft 3, so that the ball 23 deforms the inner surface of the first shaft 2 plasticly. Thereby, as shown by an imaginary line in FIG. 7C, a groove 30 which is a continuation to the groove 25 is formed. As the result of the plastic deformation of the first shaft 2, energy of the shock is absorbed. Since the ball 23 is distanced from one end of the groove 25 by the distance D, the relationship of shock load to relative axial stroke between the two shaft 2, 3 is as shown by FIG. 8. To be more precise, the initial peak value of the shock load is determined by the load required to shear the shear portions made of synthetic resin 10, and subsequent value of the shock load is determined by the load required to form the continuation groove 30 by plastic deformation of the inner surface of the first shaft 2.

In the above constitution, since the ball 23 is sandwiched between the inner surface of the first shaft 2 and the outer surface of the second shaft 3, the ball 23 is prevented from coming off the recess 21 without press fitting the ball 23 into the recess 21. Since there is no need for press fitting the ball 23 into the recess 21, it is easy to control the amount of the projection of the ball 23 from the outer surface of the second shaft 3 to a settled dimension. The groove 25 is formed only by moving the first shaft 2 relatively to the second shaft 3, so that manufacturing process and manufacturing costs are greatly reduced. By measuring the value of load required to form the groove 25 by plastic deformation of the inner surface of the first shaft 2, load to form the continuation groove 30 by plastic deformation of the inner surface of the first shaft 2 can be known before a shock acts actually on the steering device. By utilizing the measured value for the design of the shock absorbing steering device, it can be prevented previously that the driver suffers excessive shock and energy of shock is not absorbed sufficiently. Further, inferior manufactured devices which can not absorb energy of the shock properly can be found by comparing the measured value to a value required to absorb the energy properly. Thus, a shock absorbing steering device which absorbs energy of the shock properly and stably can be manufactured.

The present invention is not limited to the above embodiment. For example, although the ball 23 is positioned between the two grooves 8 in the above embodiment, the ball may be positioned out of between the two grooves. Besides, although the structure which absorbs energy of initial shock by shearing the portions made of synthetic resin 10 is employed in the above embodiment, another shock absorbing structure or no shock absorbing structure may be employed together with the shock absorbing structure according to the present invention. Besides, although the ball 23 forms the groove 25 by the axial displacement between the through hole 20 and the recess 21 after restriction of the relative rotation between the two shaft 2, 3 in the above embodiment, the ball may form the groove by angular displacement between the through hole and the recess, and then the relative rotation between the two shafts may be restricted by proper means such as combination of a longitudinal hole which is formed through the first shaft and a pin which is passed the longitudinal hole and fixed to the second shaft. Besides, although the recess 21 is formed like a groove parallel to the diametric direction of the second shaft 3 in the above embodiment, the shape of the recess is not limited, for example a shape along the circumference of the second shaft may be allowable.

Figure 9A:
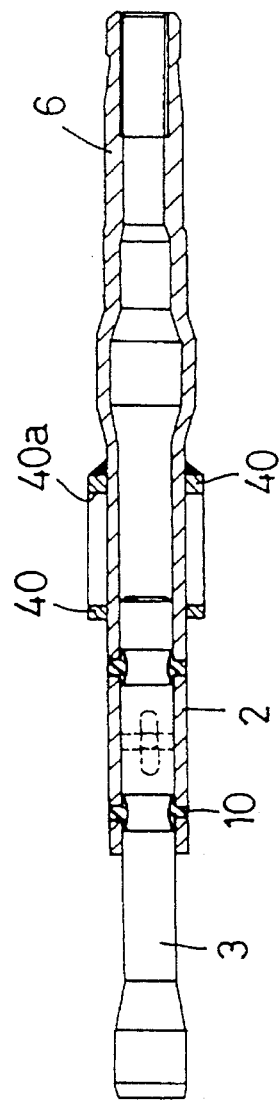
FIG. 9A, FIG. 9B and FIG. 9C are cross-sectional views showing another embodiment of steering shafts.
Figure 9B:
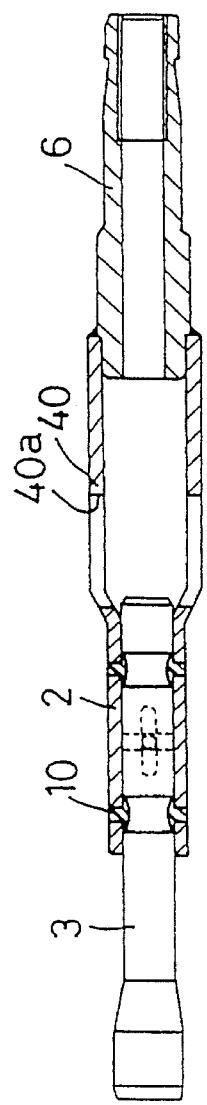
Figure 9C:
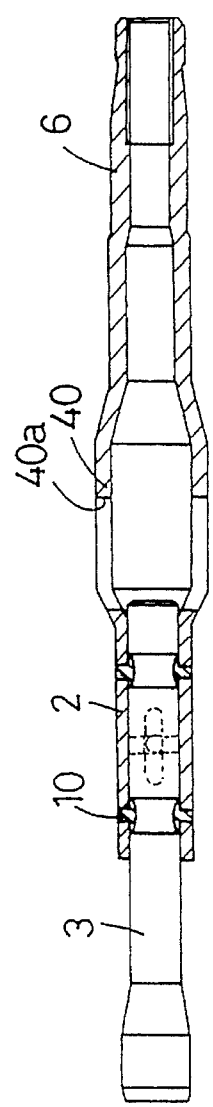

The first shaft 2, the input shaft 6, and the lock ring 40 are integrated by welding in the above embodiment, alternatively, the first shaft 2 may be integrally formed with the input shaft 6 as shown in FIG. 9A, the first shaft 2 may be integrally formed with the lock ring 40 as shown in FIG. 9B, or the first shaft 2, the input shaft 6 and the lock ring 40 may be integrally formed as shown in FIG. 9C. These integral structures improve concentricity between the first shaft 2 and the input shaft 6, so that run-out and distortion between the two shafts 2, 6 can be reduced. If the present invention has the improved concentricity structure and is applied to an electric power steering device having a torque sensor which measures steering torque based on angle of twist of a steering shaft (say of Japanese Utility Model Application HEI No. 2-80290), steering assist force according to the steering torque can be properly provided, because the accuracy of sensing the torque is improved by reducing the run-out and distortion of the steering shaft.

Figure 9D:
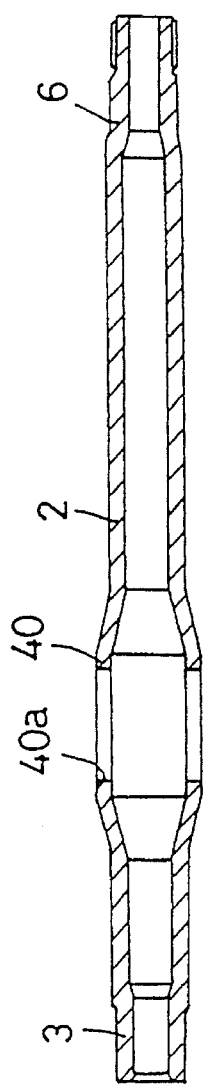
FIG. 9D illustrates a steering device having no energy absorbing structure and is shown for reference only.

In a steering device which has no energy absorbing structure, and therefore is different from the present invention, as shown in FIG. 9D, the first shaft 2, the second shaft 3, the input shaft 6 and the lock ring 40 may be all integrally formed.

Figure 10A:
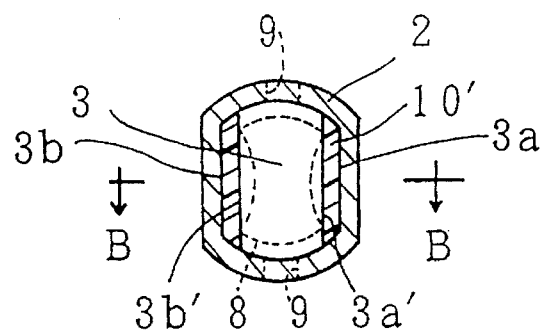
FIG. 10A is a cross-sectional view of major components of a shock absorbing steering device compared to the present invention.
Figure 10B:
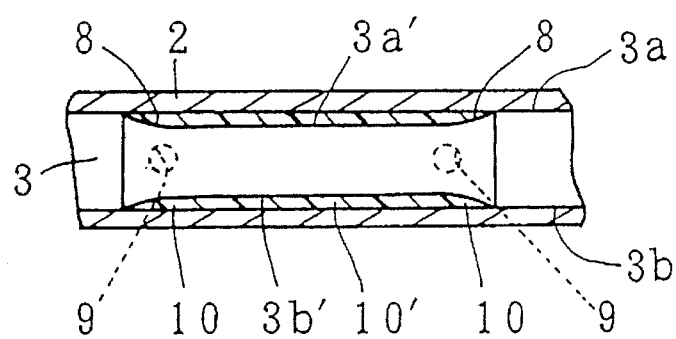
FIG. 10B is a cross-sectional view taken along the direction line B—B in FIG. 10A.
Figure 10C:
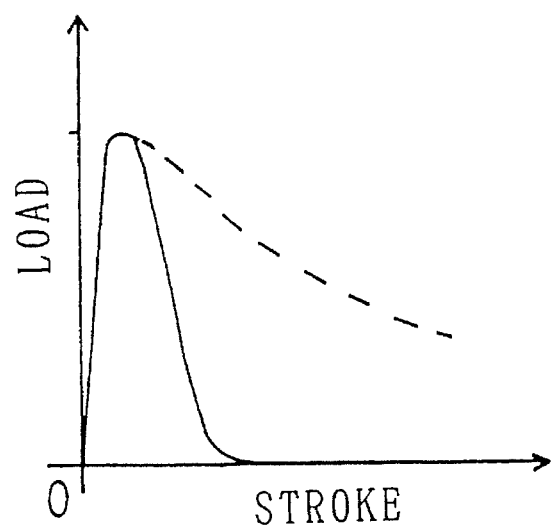
FIG. 10C shows a relationship of shock load to the relative axial stroke between a first shaft and a second shaft in the steering device in FIG. 10A.
Figure 11:
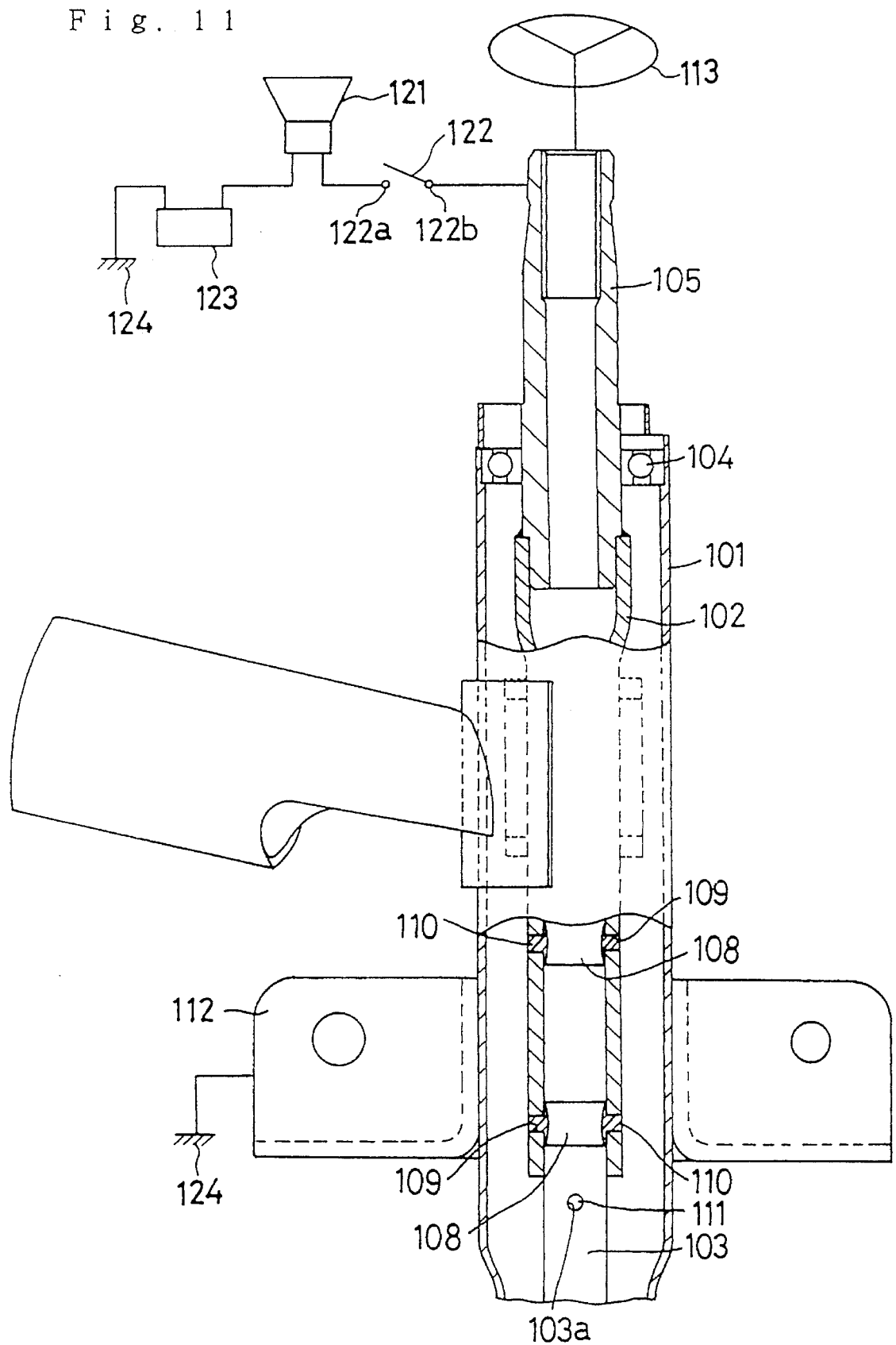
FIG. 11 is a cross-sectional view showing a conventional shock absorbing steering device.

FIG. 10A, FIG. 10B and FIG. 10C illustrate an example compared to the present invention. In the above embodiment, energy absorbing is performed as the result of plastic deformation of the inner surface of the first shaft 2 by the ball 23. Alternatively, in this comparative example, energy is absorbed by friction between friction portions made of synthetic resin 10' and an inner surface of a first shaft 2. To be more precise, two circumferential grooves 8 are formed around the outer surface of a second shaft 3. Each circumferential groove 8 faces two filler holes 9 formed through the first shaft 2. Plural shear portions made of synthetic resin 10 filled into each circumferential groove 8 and each filler hole 9 restrict relative axial movement between the first and second shafts 2, 3. In the above embodiment, the two grooves 8 are divided to each other by the interface between the flat surfaces 3a, 3b of the second shaft 3 and the inner surface of the first shaft 2. While, in this comparative example, the two circumferential grooves 8 communicate to each other via spaces formed between recessed flat surfaces 3a', 3b' of the second shaft 3 and the inner surface of the first shaft 2. Thus, when the circumferential grooves 8 are filled with synthetic resin 10 to form the shear portions, the spaces between the recessed flat surfaces 3a', 3b' and the inner surface of the first shaft 2 are filled with the synthetic resin 10', so that the friction portions are formed. When a shock acts on this comparative structure, energy of the shock is absorbed by shearing of the shear portions made of the synthetic resin 10 in the first place, wherein the relationship of shock load to relative axial stroke between the two shafts 2, 3 is as shown by a solid line in FIG. 10C. The first shaft 2 moves further relative to the second shaft 3, so that energy of the shock is absorbed by the friction between the friction portions made of the synthetic resin 10' and the inner surface of the first shaft 2, wherein the relationship of shock load to relative axial stroke between the two shaft 2, 3 is as shown by broken line in FIG. 10C. In this comparative example, it is not possible to know previously the shock load corresponding to the friction between the friction portions made of the synthetic resin 10' and the inner surface of the first shaft 2, so that there are possibilities such that the driver suffers excessive shock and energy of shock is not absorbed sufficiently, further, conductive member cannot be used to electrically connect the first shaft 2 to the second shaft 3.

What is claimed is:

1. A shock absorbing steering device having a first shaft and a second shaft, which is inserted in the first shaft so that transfer of rotation between the two shafts and relative axial movement between the two shafts are allowable, to transfer rotation of a steering wheel to a steering gear, comprising:

a through hole formed through the first shaft, a groove formed on the inner surface of the first shaft so that the groove connects with the through hole, a recess formed on the outer surface of the second shaft, and a ball held by the recess so that a portion of the ball projects from the outer surface of the second shaft, wherein the ball is sized so as to be able to pass through the through hole, and the portion of the ball projecting from the outer surface of the second shaft is inserted in the groove, and wherein the groove is formed by the projecting portion of the ball causing plastic deformation of the inner surface of the first shaft as the result of relative axial movement between the first and second shafts.

2. A shock absorbing steering device according to claim 1, wherein a shear portion is provided to restrict the relative axial displacement between the two shafts, and wherein the ball is positioned between both ends of the groove so that relative axial movement between the two shafts occurs after shearing of the shear portion.

3. A shock absorbing steering device according to claim 1, wherein a shear portion is provided to restrict the relative axial displacement between the two shafts, and wherein the ball is positioned between both ends of the groove so that relative axial movement between the two shafts occurs after shearing of the shear portion.

4. A shock absorbing steering device according to claim 2, wherein the first shaft, the second shaft, and the ball are electrically conductive and constitute a part of a horn driving circuit.

5. A shock absorbing steering device according to claim 3, wherein the first shaft, the second shaft, and the ball are electrically conductive and constitute a part of a horn driving circuit.

6. A method of manufacturing a shock absorbing steering device having a first shaft and a second shaft, which is inserted in the first shaft so that transfer of rotation between the two shafts and relative axial movement between the two shafts are allowable, to transfer rotation of a steering wheel to a steering gear, comprising the steps of:

inserting a ball in a through hole formed through the first shaft, holding the ball by a recess formed on the outer surface of the second shaft so that a portion of the ball projects from the outer surface of the second shaft, and forming a groove on the inner surface of the first shaft connecting with the through hole formed through the first shaft by moving the first and second shafts relative to each other in an axial direction such that the portion of the ball projecting from the outer surface of the second shaft causes plastic deformation of the inner surface of the first shaft.

7. A method of manufacturing a shock absorbing steering device according to claim 6, wherein a load required for causing plastic deformation of the inner surface of the first shaft with the ball is measured when the groove is formed by the ball as a result of moving the first and second shafts relative to each other in an axial direction.

\* \* \* \* \*